United States Patent
Albrecht

(10) Patent No.: US 10,942,199 B2
(45) Date of Patent: Mar. 9, 2021

(54) FORCE MICROSCOPE WITH HELIUM ATMOSPHERE

(71) Applicant: MOLECULAR VISTA, INC., San Jose, CA (US)

(72) Inventor: Thomas R. Albrecht, San Jose, CA (US)

(73) Assignee: MOLECULAR VISTA, INC., San Jose, CA (US)

( * ) Notice: Subject to any disclaimer, the term of this patent is extended or adjusted under 35 U.S.C. 154(b) by 0 days.

(21) Appl. No.: 16/607,084

(22) PCT Filed: Apr. 24, 2018

(86) PCT No.: PCT/US2018/029232
§ 371 (c)(1),
(2) Date: Oct. 21, 2019

(87) PCT Pub. No.: WO2018/200595
PCT Pub. Date: Nov. 1, 2018

(65) Prior Publication Data
US 2020/0379005 A1    Dec. 3, 2020

Related U.S. Application Data

(60) Provisional application No. 62/489,374, filed on Apr. 24, 2017.

(51) Int. Cl.
*G01Q 30/12* (2010.01)

(52) U.S. Cl.
CPC .................................. *G01Q 30/12* (2013.01)

(58) Field of Classification Search
CPC ...................................................... G01Q 30/12
See application file for complete search history.

(56) References Cited

U.S. PATENT DOCUMENTS

| | | |
|---|---|---|
| 5,410,910 A | 5/1995 | Somlyo et al. |
| 2013/0145506 A1 | 6/2013 | Dean et al. |
| 2015/0226766 A1 | 8/2015 | Paredis et al. |

FOREIGN PATENT DOCUMENTS

GB    2532408 A    5/2016

OTHER PUBLICATIONS

Chen et al, "Resonate Response of Scanning Force Microscopy Cantilevers", Abstract, p. 2535, Aug. 1, 1994.
International Patent Application No. PCT/US2018/029232,International Search Report, 17 pages (dated Aug. 13, 2018).

*Primary Examiner* — Nicole M Ippolito
*Assistant Examiner* — Hanway Chang
(74) *Attorney, Agent, or Firm* — Loza & Loza, LLP; Thomas H. Ham

(57) ABSTRACT

A scanning force microscope and method for operating the scanning force microscope uses an enclosed chamber to create a reduced damping environment with a damping-reducing gas at a pressure below one atmospheric pressure to engage a sample of interest.

14 Claims, 2 Drawing Sheets

Evacuate at least some air from an enclosed chamber using a pump, the enclosed chamber containing at least a probe tip and a sample scanner of the scanning force microscope — 202

Introduce a damping-reducing gas into the enclosed chamber after evacuation of air from the enclosed chamber without increasing pressure within the enclosed chamber to one atmospheric pressure, the damping-reducing gas being gas exhibiting less damping on a vibrating cantilever than air — 204

Engage a sample on the sample scanner using the probe tip in a reduced damping environment with the damping-reducing gas within the enclosed chamber at a pressure below one atmospheric pressure to measure properties of the sample — 206

FORCE MICROSCOPE WITH HELIUM ATMOSPHERE

CROSS-REFERENCE TO RELATED APPLICATION

This application is entitled to the benefit of provisional U.S. Patent Application Ser. No. 62/489,374, filed Apr. 24, 2017, which is incorporated herein by reference.

BACKGROUND

Atomic or scanning force microscopy uses a sharp probe tip attached to a cantilever to interact with a sample of interest in order to measure properties of the sample, which may then be displayed as an image. For various applications, it is highly desirable to enhance the Q (also known as quality factor) of the cantilever, which is made to vibrate during the sample measurements. One way to enhance the Q of the cantilever may be to create an environment in which the Q of the cantilever is increased. However, a concern with any new environment for a scanning force microscope is any external thermal influence on the interaction between the sharp probe tip and the sample of interest.

SUMMARY

A scanning force microscope and method for operating the scanning force microscope uses an enclosed chamber to create a reduced damping environment with a damping-reducing gas at a pressure below one atmospheric pressure to engage a sample of interest.

A scanning force microscope in accordance with an embodiment includes an enclosed chamber, a cantilever with a probe tip contained within the enclosed chamber, a sample scanner contained within the enclosed chamber, the sample scanner being used to place a sample of interest for interaction with the probe tip, a pump connected the enclosed chamber to evacuate the enclosed chamber of air, and a source of a damping-reducing gas connected to the enclosed chamber to introduce the damping-reducing gas after evacuation of air from the enclosed chamber without increasing pressure within the enclosed chamber to one atmospheric pressure. The damping-reducing gas is gas exhibiting less damping on a vibrating cantilever than air.

A method for operating a scanning force microscope in accordance with an embodiment comprises evacuating at least some air from an enclosed chamber using a pump, the enclosed chamber containing at least a probe tip and a sample scanner of the scanning force microscope, introducing a damping-reducing gas into the enclosed chamber after evacuation of air from the enclosed chamber without increasing pressure within the enclosed chamber to one atmospheric pressure, the damping-reducing gas being gas exhibiting less damping on a vibrating cantilever than air, and engaging a sample on the sample scanner using the probe tip in a reduced damping environment with the damping-reducing gas within the enclosed chamber at a pressure below one atmospheric pressure to measure properties of the sample.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

The Q (also known as quality factor) of a vibrating cantilever of the type used in a force microscope can be increased by reducing pressure, or by using an atmosphere of a low viscosity gas such as helium (He). Furthermore, helium has a higher thermal conductivity at pressures near atmospheric pressure than ambient air. Examples of references that support these findings are:

1. Chen et al., Rev. Sci. Instrum. 65, 2532-2537 (1994), "Resonance response of scanning force microscopy cantilevers." Reduced damping on a vibrating cantilever of helium atmosphere compared to air is attributable to the difference in viscosity. Cantilevers show 2 times higher Q in a helium atmosphere versus air at room temperature.
2. Jungchul Lee et al., Proceedings of the ASME/Pacific Rim Technical Conference and Exhibition on Integration and Packaging of MEMS, NEMS, and Electronic Systems: Advances in Electronic Packaging 2005, pages 1767-1772 (2006), "Characterization of heated atomic force microscope cantilevers in air and vacuum." Thermal conductivity of helium is higher than that of air in the range of 0.1 to 1 atm.
3. CRC Handbook of Chemistry and Physics, $66^{th}$ ed., R. C. Weast, The Chemical Rubber Co., page E-2 (1985). Thermal conductivity of He gas is 6 times higher than air at ambient temperature and pressure.
4. Hansma et al., Biophys J. 68, 1672-1677 (1995), "Applications for atomic force microscopy of DNA." Use of helium atmosphere at ambient atmospheric pressure as a favorable environment to stabilize dry biological samples.
5. D'Augustino et al., J. Microscopy 246, 129-142 (2012), "Development and testing of hyperbaric atomic force microscopy (AFM) and fluorescence microscopy for biological applications." Use of helium atmosphere in a hyperbaric chamber with an AFM.

However, the advantages of using a helium atmosphere at reduced pressure to accomplish both goals simultaneously have not been previously disclosed. The pressure range where this works is higher than most people would use for enhanced Q (not realizing that with helium, the pressure does not have to approach vacuum).

A scanning force microscope in accordance with embodiments of the invention is operated in a helium environment at pressures ranging from a fraction of an atmosphere up to (but not including) one (1) atmosphere. The microscope is operated in an AC mode (continuous vibration of the cantilever), and the resulting increased cantilever Q provides enhanced sensitivity.

Figure 1:
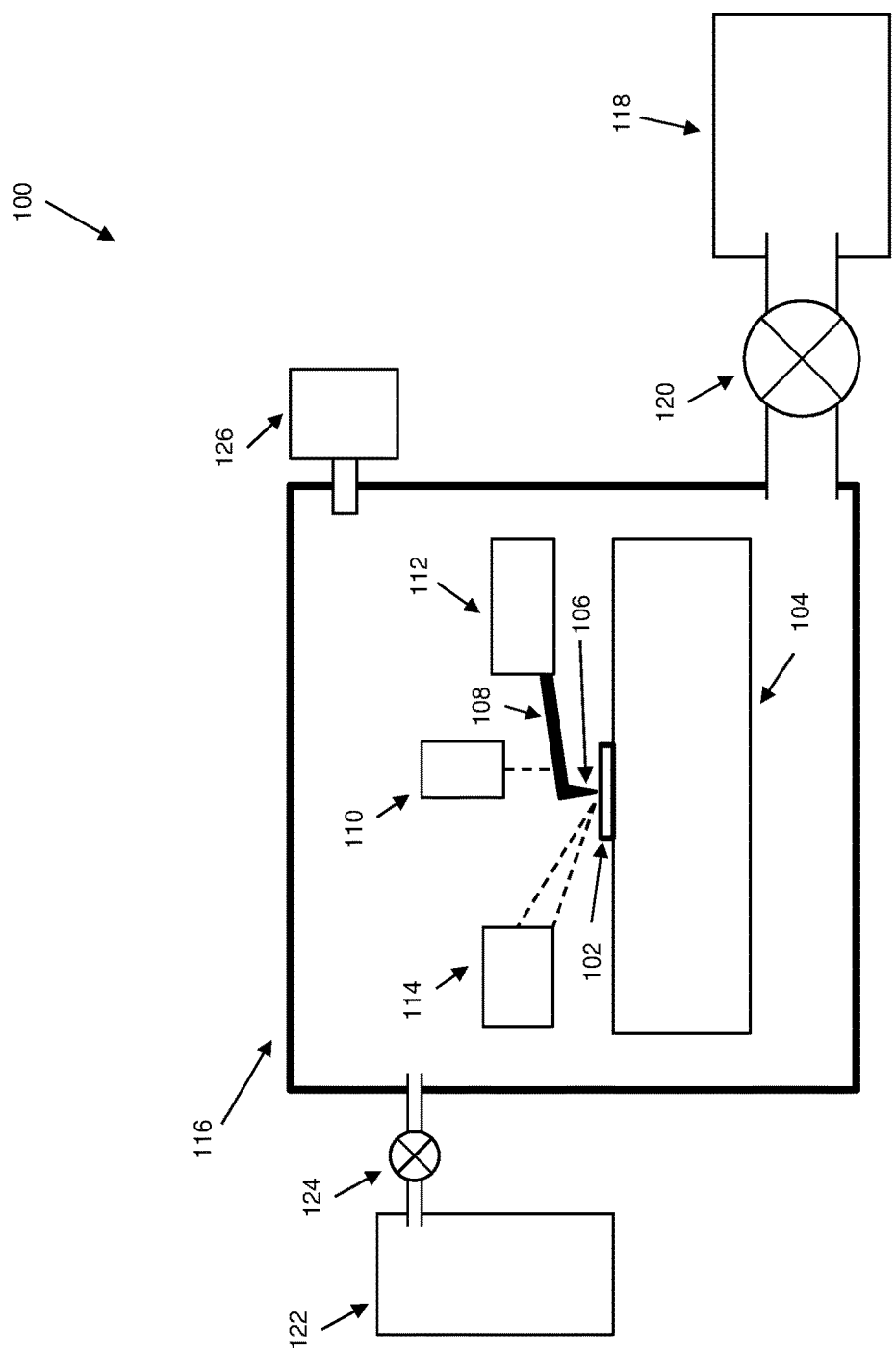
FIG. 1 is a block diagram of a scanning force microscope in accordance with an embodiment of the invention.

FIG. 1 is a diagram an atomic force microscope (AFM) 100 in accordance with an embodiment of the invention. The AFM 100 includes a sample 102 to be examined mounted on a sample scanner 104, which may be designed to be controlled by one or more piezo motion devices for X, Y, and Z motion. The AFM 100 also includes a sharp probe tip 106 on a flexible microcantilever 108 that interacts with the sample 102, and nm-scale deflection of the cantilever 108 is sensed by a suitable deflection sensor 110, which is usually an optical lever system. For AC mode operation, a dither drive 112 vibrates the cantilever, usually at one of its mechanical resonance frequencies. Forces or force gradients acting between the sample 102 and the sharp tip 106 change the vibration amplitude, frequency, or phase of the vibrating cantilever 108, and these changes are interpreted by a controller (not shown) to generate an image of the sample surface to indicate the spatial variation of some property of the sample. In its simplest operation mode, an AFM maps the topography of the sample by maintaining a constant gap between the tip and sample surface as the sample is raster scanned under the tip. By tracking and recording the control signals necessary to maintain a constant gap, a topographic image can be generated. If a tunable light source 114 is added as shown in FIG. 1, and the light from this source is focused on the tip-sample interface, absorption of light by the sample gives rise to force and force gradients acting between the tip and sample. Such forces and force gradients may also affect the amplitude, frequency, or phase of vibration of the cantilever. By recording these changes as a function of light wavelength and position on the sample, spectrographic images of the wavelength-dependent optical absorption of the sample may be generated, and operating in this mode is referred to as photo-induced force microscopy (PiFM). A more detailed description of PiFM, its theory of operation, and description of apparatus can be found in the publication "Nanoscale chemical imaging by photoinduced force microscopy" by D. Nowak et al., Science Advances vol. 2, page e1501571 (2016), which is incorporated herein by reference.

As shown in FIG. 1, the tip 106 and the sample 102 of the AFM 100 are enclosed in an air-tight enclosed chamber 116, which may optionally include other elements of the AFM such as the scanner 104, the deflection sensor 110, and the tunable light source 114 (or light may be brought in through a transparent window or optical fiber). After evacuating most of the air from the chamber 116 using a vacuum pump 118 connected to the chamber via a valve 120, sufficient helium gas is introduced into the chamber from a He source 122 (e.g., a tank of He) using another valve 124 to achieve a target pressure in the chamber using a pressure sensor 126 attached to the chamber. Thus, a reduced damping environment with mostly helium at less than one atmospheric pressure is created within the chamber to measure interactions between the probe tip 106 and the sample 102.

By maintaining at least a fraction of an atmosphere of He pressure (as opposed to vacuum) in the chamber 116, cooling of system components in the helium environment is similar to or better than operating in ambient air. Operating at reduced pressure in He is particularly beneficial for PiFM for increasing sensitivity and resolution, and mitigating thermal drift which could be caused by equipment heating in vacuum, since it may be necessary to examine a particular location on a sample for an extended period of time for the purpose of recording the photo-induced force at many wavelengths of light.

Operating in low pressure (e.g., 0.1-1 atm) helium requires a simpler apparatus than operation in vacuum requires. For vacuum operation, a more elaborate vacuum pump is needed, and the chamber 116 must be sealed well enough to hold a suitable vacuum level for an extended period, since operation of the pump is generally incompatible with operation of the microscope because of vibrations. Furthermore, to mitigate thermal drift caused by self-heating of the microscope components, operating in vacuum may require the use of active temperature control, such as a thermoelectric cooler, or a heater with temperature controller, to keep temperatures sufficiently constant to avoid excessive thermal drift. Such temperature control systems may have long stabilization times, lowering the productivity of the user while waiting for temperature stabilization.

In an embodiment of the invention, the AFM 100 is operated at a helium pressure which provides the same cooling as the instrument has in ambient air. Since the thermal conductivity of He is six times higher than air at full atmospheric pressure (1 atm), the pressure at which He provides the same cooling as air at 1 atm would typically be in the range of 0.1 to 0.5 atm. By matching the cooling as ambient air, the temperature of microscope elements in the chamber will tend to stay stable when the chamber is closed and the microscope is operated versus when the chamber is opened for sample exchange, idle time when not in use, etc. This choice of He pressure eliminates temperature changes when switching from air atmosphere to He atmosphere and the associated temperature stabilization time that would be needed to reduce thermal drift to an acceptable level. When operating at this He pressure, the instrument may be used immediately after changing to He atmosphere, without down time waiting for temperature stabilization. Although this might be viewed as a rather mild vacuum, because of the reduced damping effect of He gas on a vibrating cantilever, Q is significantly enhanced compared to operation at full atmospheric pressure in air.

In an embodiment of the invention, the cantilever 108 of the AFM 100 is driven to vibrate by providing a fixed frequency and amplitude of dither vibration from the dither drive 112. The drive frequency is typically at one of the free-space resonances (or "eigenmodes") of the cantilever (resonant frequency when it is not close to or interacting with the sample) or slightly above this resonance, but still well within the width of the resonance peak. When the tip 106 is brought close to the sample 102, force gradients acting between the sample and tip typically lower the resonant frequency, causing the fixed drive frequency to deviate further from the center of the resonance peak, which result in a decrease in vibration amplitude. Changes in amplitude can be used to track changes in the tip-sample interaction. This mode is conventionally known as the amplitude modulation (AM) mode or the slope detection mode. In this mode, the high Q of the cantilever 108 reduces the bandwidth of the system, so that it takes about Q cycles of oscillation for the amplitude to change when the interaction force gradient changes. By choosing to operate at a pressure where Q is not exceedingly high (i.e., at a fraction of an atmosphere of pressure rather than high vacuum) and by choosing a resonant mode with a sufficiently high frequency (such as the second vibrational mode rather than the first vibrational mode) sufficient bandwidth can be achieved with the AM mode, which is generally the simplest mode of operation.

Another option is to detect the tip-sample interaction force gradients by measuring changes in the phase of the cantilever vibration with respect to the fixed driving signal. This mode is also a well-known mode of operation for AFM.

Alternatively, as is also well-known for conventional AFM, a frequency modulation (FM) mode may be used, which overcomes the bandwidth concern, but is more complex to implement. A particular implementation of the FM mode is to drive the cantilever 108 with a variable frequency oscillator, and adjust the frequency so that the phase of the cantilever vibration is held constant with respect to the cantilever drive signal using a phase locked loop (PLL). An alternative FM mode is to self-oscillate the cantilever at one of its vibrational resonant frequencies by amplifying and filtering the output of the deflection sensor and using this signal as the dither drive source.

For PiFM, two vibrational modes of the cantilever 108 are typically employed. One vibrational mode is for tracking topography and maintaining a constant tip-sample spacing, and a second vibrational mode is for sensing photo-induced force or force gradient. The tunable light source 114 is typically modulated at a frequency which is the difference frequency of the two vibrational cantilever modes employed. This is referred to as the sideband mode of operation for PiFM. Alternatively, the light source 114 may be modulated at a resonant frequency of the cantilever 108. This is known as the direct drive mode for PiFM.

Although the AFM 100 has been described with respect to helium atmosphere, in other embodiments, another damping-reducing gas or a combination of damping-reducing gas may be used instead of helium. As used herein, a damping-reducing gas is gas exhibiting less damping on a vibrating cantilever than air.

Figure 2:
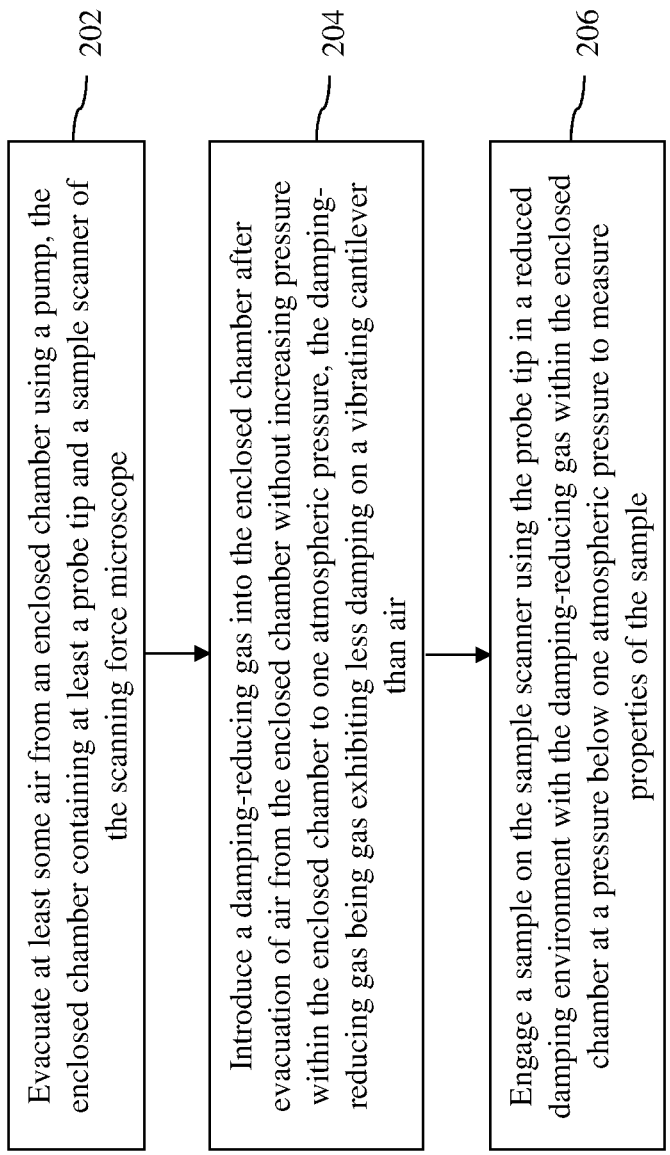
FIG. 2 is a flow diagram of a method for operating a scanning force microscope in accordance with an embodiment of the invention.

Turning now to FIG. 2, a process flow diagram of a method for operating a scanning force microscope, e.g., the atomic force microscope 100, in accordance with an embodiment of the invention is shown. At block 202, at least some air from an enclosed chamber of the scanning force microscope is evacuated using a vacuum pump. The enclosed chamber of the scanning force microscope contains at least a probe tip and a sample scanner of the scanning force microscope. Next, at block 204, a damping-reducing gas is introduced into the enclosed chamber after evacuation of air from the enclosed chamber without increasing pressure within the enclosed chamber to one atmospheric pressure. Thus, the pressure in the enclosed chamber is maintained at below one atmosphere. The damping-reducing gas is any gas that exhibits less damping on a vibrating cantilever than air, such as helium. In an embodiment, helium is introduced or allowed to enter into the enclosed chamber until the enclosed chamber includes at least 75% helium with the remainder being other gases. In another embodiment, helium is introduced or allowed to enter into the enclosed chamber until the enclosed chamber includes at least 95% helium with the remainder being other gases. In an embodiment, helium is introduced or allowed to enter into the enclosed chamber until the pressure in the enclosed chamber is between 0.1 and 1 atmosphere. In another embodiment, helium is introduced or allowed to enter into the enclosed chamber until the pressure in the enclosed chamber is at a predefined pressure that is selected so that the temperature of microscope elements within the enclosed chamber is substantially similar (+/−five degrees Celsius) to the temperature of the microscope elements when operated in ambient environment, i.e., air environment at ambient temperature and pressure. In an embodiment, the predefined pressure is between 0.1 and 0.5 atmosphere.

Next, at block 206, a sample on the sample scanner of the scanning force microscope is engaged using the probe tip in a reduced damping environment with the damping-reducing gas within the enclosed chamber at a pressure below one atmospheric pressure to measure properties of the sample. In an embodiment, force gradients between the probe tip and the sample are detected by a change in amplitude of a vibrating cantilever of the scanning force microscope that is driven to oscillate at a frequency near a mechanical resonance of the cantilever. The resonance of a cantilever can be either sharp or broad. The sharpness of the resonance is described by the so-called "Quality Factor" Q of the resonance. The width of the resonance is roughly equal to the resonant frequency (at the center of the resonance) divided by the Q. So for example, if a cantilever has a resonant frequency of 100 kHz and a Q factor of 100, then its resonance is about 1 kHz wide. If a cantilever has a resonance of 100 Khz and a Q of 10,000, then its resonance is only 10 Hz wide. Thus, as used herein, "near" a resonance means that the frequency is within the peak width of the resonance, or in other words, it is within approximately Fr/Q cycles of the center of the resonance, where Fr is the resonant frequency, and Q is the quality factor. The Q goes up as viscous drag from the atmosphere is reduced. For example, a cantilever that has a Q of 100 in ambient air for a particular resonance will see the Q value increase as the pressure is reduced (pumping down in a chamber). Likewise, if the air is replaced with helium, Q will increase relative to what it was in air at the same pressure.

In another embodiment, the force gradients are detected by a change in phase of the vibrating cantilever driven to oscillate at a frequency near a mechanical resonance of the cantilever. In another embodiment, the force gradients are detected by a change in frequency of the vibrating cantilever driven to self-oscillate at a frequency near a mechanical resonance of the cantilever. In this embodiment, the oscillation frequency of the cantilever may be controlled by a phase locked loop (not shown) which includes a detector measuring the phase of the cantilever oscillation relative to a driving signal. In an embodiment, the tip-sample junction is illuminated by a modulated light source operating at a specific wavelength or over a specific band of wavelengths, wherein the modulated light source causes a time varying force or force gradient acting on the tip, and the time varying force or force gradient is detected and recorded by the microscope. In this embodiment, surface topography of the sample may be sensed using one vibrational eigenmode of the cantilever, and the force or force gradient generated by the interaction of the sample with the modulated light source is sensed using a second vibration eigenmode of the cantilever. The laser modulation frequency may be the same as one of the eigenmode frequencies of the cantilever. Alternatively, the laser modulation frequency may be a difference or sum frequency of the frequencies of two vibrational eigenmodes of the cantilever.

The components of the embodiments as generally described in this document and illustrated in the appended figures could be arranged and designed in a wide variety of different configurations. Thus, the detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, non-volatile memory, NVMe device, persistent memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method of operating a scanning force microscope, the method comprising:
   evacuating at least some air from an enclosed chamber, the enclosed chamber containing at least a probe tip and a sample scanner of the scanning force microscope;
   introducing a damping-reducing gas into the enclosed chamber after evacuation of air from the enclosed chamber without increasing pressure within the enclosed chamber to one atmospheric pressure, the damping-reducing gas being gas exhibiting less damping on a vibrating cantilever than air; and
   engaging a sample on the sample scanner using the probe tip in a reduced damping environment with the damping-reducing gas within the enclosed chamber at a pressure below one atmospheric pressure to measure properties of the sample.

2. The method of claim 1, wherein introducing the damping-reducing gas into the enclosed chamber includes introducing helium into the enclosed chamber after evacuation of air from the enclosed chamber without increasing the pressure within the enclosed chamber to one atmospheric pressure.

3. The method of claim 2, wherein introducing helium into the enclosed chamber includes introducing helium into the enclosed chamber until the enclosed chamber includes at least 75% helium with the remainder being other gases.

4. The method of claim 3, wherein introducing helium into the enclosed chamber includes introducing helium into the enclosed chamber until the enclosed chamber includes at least 95% helium with the remainder being other gases.

5. The method of claim 2, wherein introducing helium into the enclosed chamber includes introducing helium into the enclosed chamber until the pressure in the enclosed chamber is between 0.1 and 1 atmosphere.

6. The method of claim 2, wherein introducing helium into the enclosed chamber includes introducing helium into the enclosed chamber until the pressure in the enclosed chamber is at a predefined pressure that is selected so that the temperature of microscope elements within the enclosed chamber is substantially similar to the temperature of the microscope elements when operated in ambient environment.

7. The method of claim 6, wherein the predefined pressure is between 0.1 and 0.5 atmosphere.

8. A scanning force microscope comprising:
   an enclosed chamber;
   a cantilever with a probe tip contained within the enclosed chamber;
   a sample scanner contained within the enclosed chamber, the sample scanner being used to place a sample of interest for interaction with the probe tip;
   a pump connected the enclosed chamber to evacuate the enclosed chamber of air; and
   a source of a damping-reducing gas connected to the enclosed chamber to introduce the damping-reducing gas after evacuation of air from the enclosed chamber without increasing pressure within the enclosed chamber to one atmospheric pressure, the damping-reducing gas being gas exhibiting less damping on a vibrating cantilever than air.

9. The scanning force microscope of claim 8, wherein the source of the damping-reducing gas is a source of helium.

10. The scanning force microscope of claim 9, wherein the enclosed chamber includes at least 75% helium with the remainder being other gases.

11. The scanning force microscope of claim 10, wherein the enclosed chamber includes at least 95% helium with the remainder being other gases.

12. The scanning force microscope of claim 9, wherein the pressure in the enclosed chamber is between 0.1 and 1 atmosphere.

13. The scanning force microscope of claim 9, wherein the pressure in the enclosed chamber is at a predefined pressure that is selected so that the temperature of microscope elements within the enclosed chamber is substantially similar to the temperature of the microscope elements when operated in ambient environment.

14. The scanning force microscope of claim 13, wherein the predefined pressure is between 0.1 and 0.5 atmosphere.

\* \* \* \* \*